Aug. 23, 1927.

J. MORAVEC

1,640,007

PAPER MAKING MACHINE

Filed Nov. 19, 1925

J. MORAVEC

1,640,007

PAPER MAKING MACHINE

Filed Nov. 19, 1925

J. MORAVEC

PAPER MAKING MACHINE

1,640,007

Filed Nov. 19, 1925    7 Sheets-Sheet 5

Inventor:
John Moravec,
by *his* Attorney.

Patented Aug. 23, 1927.

1,640,007

UNITED STATES PATENT OFFICE.

JOHN MORAVEC, OF VANCOUVER, BRITISH COLUMBIA, CANADA.

PAPER-MAKING MACHINE.

Application filed November 19, 1925. Serial No. 70,036.

This invention relates to paper-making machines, with particular reference to paper machines of the Fourdrinier type in which a traveling wire-cloth known as a Fourdrinier "wire" is employed in connection with suction-boxes over which it carries the wet pulp or stock for the purpose of withdrawing the water therefrom as the paper sheet or web is formed.

The objects of the invention are to protect the wire against wear and injury and to preserve the same in operative condition to the utmost extent possible and also to so construct and arrange the parts of the machine that, when at length it becomes necessary to replace the wire by a new one, such substitution may be carried out with a minimum of time and labor, and consequent costs.

The great rate of production of modern paper-making machines renders it necessary that the wire travel at an enormous speed over the table-rolls which drain a large quantity of water from the paper-stock and the suction-boxes which remove most of the remaining water and which present a large area to the wire. The suction of the suction-boxes is maintained by a powerful vacuum-pump and is so great as to cause a very high degree of friction between the running wire and the perforated surface of these suction-boxes. In this way the wear on the costly wire-screen apron becomes exceedingly great and consequently its life is very short, so that the upkeep of fast-running paper machines is very expensive. Moreover, each replacement of a worn-out wire involves not only the expenditure of a considerable amount of unproductive labor, but it also leads to interruptions in the operation of the machine covering very appreciable periods of time.

This excessive wear of the wire and the frequent stoppages and interruptions of the operation of the paper machine are overcome by a device embodying my invention and which consists in a traveling support for the Fourdrinier wire arranged to sustain and carry the same over the suction-boxes with the usual velocity and without friction and, moreover, so as not to reduce or interfere with the vacuum effect of the suction-boxes, for which purpose the traveling support is openwork in form as hereinafter set forth.

More specifically considered, the preferred embodiment of my invention comprises perforated metal covers for suction-boxes said covers being preferably provided with guiding means, such as a transverse series of grooves extending in a longitudinal direction with respect to the paper-making machine, in combination with link-chains adapted to fit into and fill out the grooves and to extend to the upper surface of the box covers. These links, while fitting snugly into the grooves, must be sufficiently loose therein to slip through the same readily and with a minimum of resistance or friction. The chains as they pass through the grooves will not interfere with the suction of the suction-boxes, since the water draining through the wire cloth can readily pass by way of the open links of said chains and the link joints act like a piston to sweep the descending water over the perforations of the suction-box covers, thereby assisting the operation of the suction apparatus. To obtain the best results the suction-box covers and the chains are made of such metal as will furnish a sufficiently low co-efficient of friction to insure a safe and constant running at the rate of speed necessary for the paper machine.

By this novel arrangement the frictional action is removed from the wire-cloth and transferred to the surfaces of the suction-boxes and the chains, thereby preserving the wire-cloth and very greatly extending its life and also considerably reducing the motive power required for moving the wire-cloth over the suction areas.

My invention also comprises novel arrangements of the suction-boxes and accessory parts whereby they can be speedily and expeditiously removed from the machine and also reinstalled in the same when it becomes necessary to replace the old wire by a new one, which contingency, however, arises only after an exceedingly long period when employing the construction and arrangement outlined above.

Other features of my invention will be hereinafter set forth and pointed out in the appended claims.

In the accompanying drawing I have illustrated the preferred embodiment of my invention. In this drawing:

Fig. 3 is an end elevation thereof, and Fig. 3ª a similar detail view of the left-hand portion of the parts therein, with certain parts removed;

The same characters of reference designate the same parts throughout all of the figures of the drawing.

As in machines of this type, the pulp or paper stock is conveyed on a woven wire-screen apron A, briefly termed the "wire" in the art and hereafter in this specification, which at its edges travels under the deckel-straps B which run over the deckel pulley $b$, and under the dandy-roll C, and over the series of suction-boxes D, the dandy-roll C being situated at an intermediate point over the suction-boxes as shown, the wire with the paper stock, drained of water, passing thence over roll $a$ between the couch-rolls E, E′ and thence over a number of rolls $a'$ $a'$ to the point of beginning, as is well understood.

In order to preserve the wire A and protect the same against wear and injury, the same, according to my invention, is supported by a traveling carrier consisting in the present showing in a series of endless traveling chains 1 each mounted on drive-rolls 2, which are driven from any suitable source of power, preferably independently of the bottom couch roll E′, and passing thence over grooved guide-rolls 3. These chains lie between the wire and the perforate top of the suction-boxes D.

Figures 1, 1A:
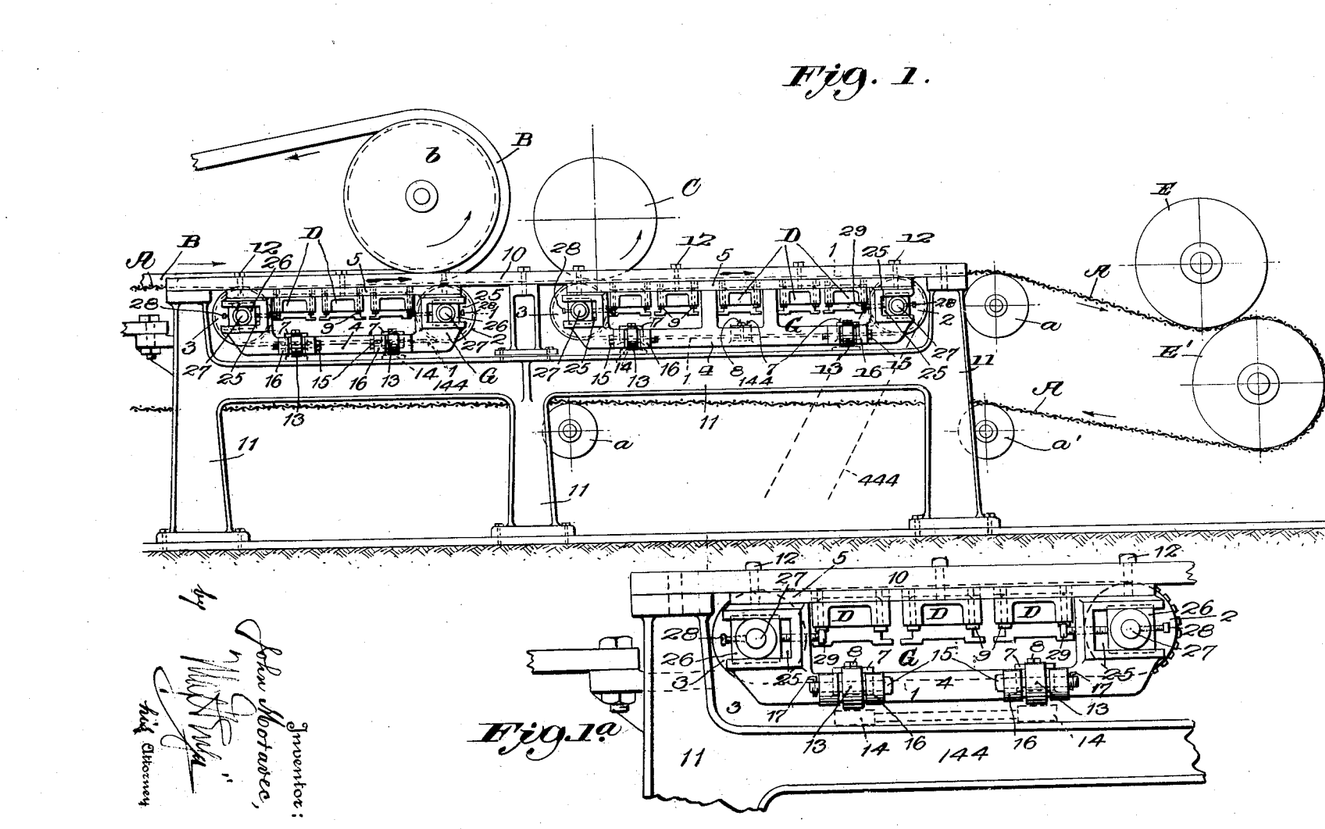
Fig. 1 represents a side elevation of the forward portion of a paper-making machine of the Fourdrinier type with my invention incorporated therein, and Fig. 1ª an enlargement of a part thereof.
Figure 2:
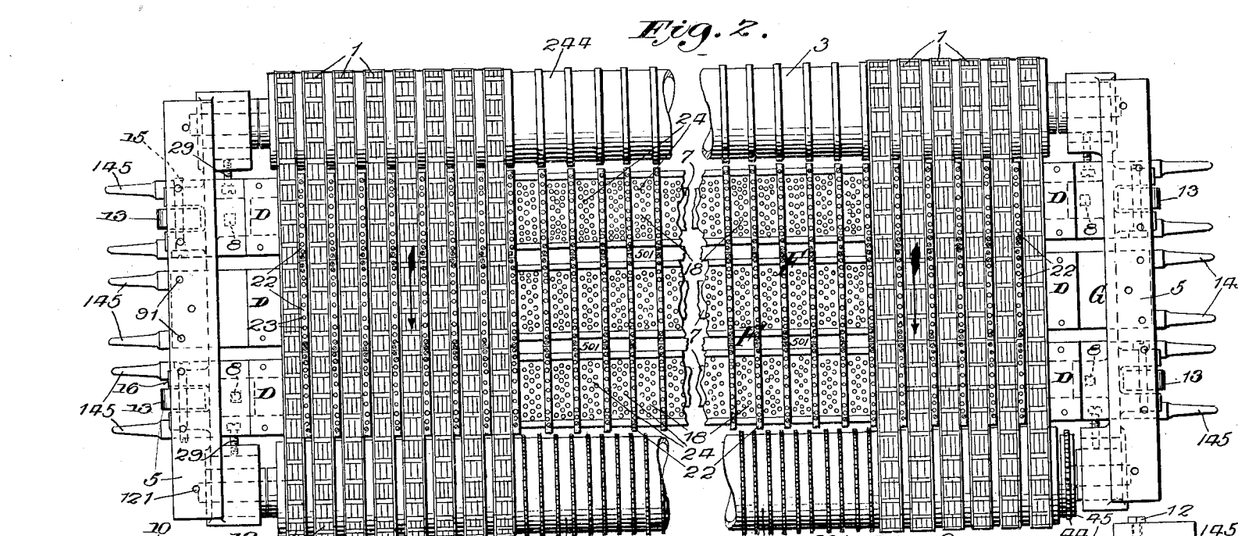
Fig. 2 is a top plan view, showing the carrier for the wire-cloth removed in part to expose the suction-boxes.
Figure 3:
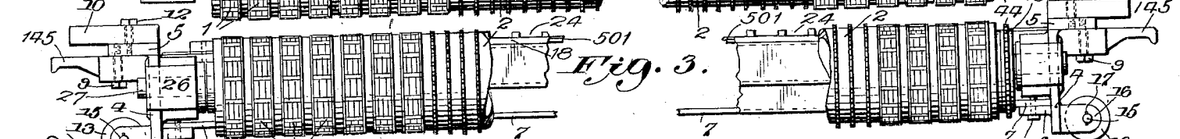
Figures 3A, 5:
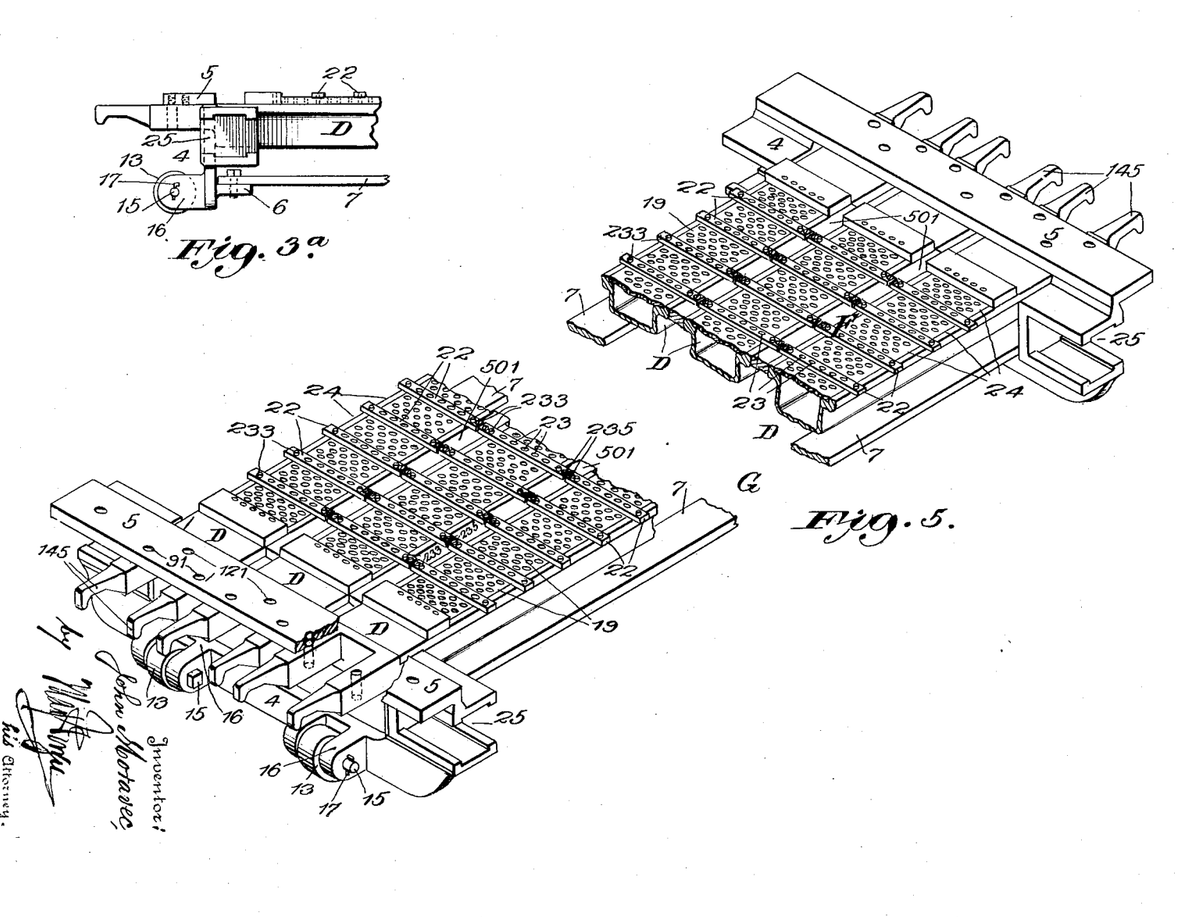
Fig. 5, an isometric perspective view of the suction-box group-structure under my invention.
Figure 4:
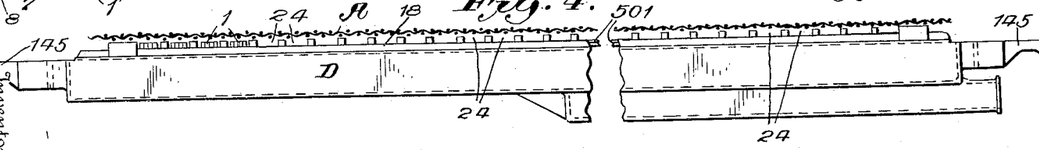
Fig. 4 is a similar view of a suction-box with the wire-cloth in situ over the same.

As shown in Figs. 1, 1ª and 2, the suction-boxes in the present instance are mounted in the machine in two groups, one group of 3 suction-boxes being arranged behind the dandy-roll C and the other group of 5 suction-boxes having its position in advance of the same. Each of these groups of suction-boxes forms part of one connected and rigid structure or unit G which may be removed from or introduced into the machine at one operation, thus doing away with the time-expenditure and tediousness of removing the suction-boxes separately and one by one, as has been necessary with machines of this character heretofore. This suction-box group-structure comprises a pair of rigid cast metal end-frames 4 for each group, one at each end of the suction-boxes, as seen in Figs. 1, 2 and 5, said frame being formed at its upper portion with a broad horizontal flange or shelf 5 extending the length of the casting, and at its lower portion with inwardly projecting lips or lugs 6, best seen in Fig. 3. The frames 4 are at their lower portion connected by flat iron stays or struts 7 bolted at their ends at 8 to the lugs 6 (see 1, 1ª, 2 and 5). These stays are placed at intervals and are of the number necessary to furnish the necessary strength and rigidity. In the present case I have shown 2 such stays for the three-suction-box structure and three-stays 7 for the structure comprising five suction-boxes. The upper transverse stiffening is formed by the parallel suction-boxes D which, as indicated in Figs. 1, 1ª and 3 and 5 are firmly and immovably bolted in an accurate horizontal line to the lower flat surface of the flanges 5, 5 at each side of the machine by bolts 9. The hollow metal castings of the suction-boxes possess the necessary stiffness to aid in forming a strong framework not subject to vibrations. The suction-box group structure so arranged is firmly secured removably to and immovably connected with the usual railing 10 of the machine-frame 11 by cap-screws 12 in the manner in which the suction-boxes have usually been secured.

As shown in Figs. 1, 1ª, 2 and 3, each suction-box group structure is provided at each end with rollers 13 for rolling the entire structure comprising three or five suction-boxes out of the machine when a new Fourdrinier wire is to be installed. This withdrawal of the structure is accomplished, after the cap-screws 12 have been removed, by first introducing into the machine under the rollers 13 a temporary track or platform 14 indicated in dotted lines in Figs. 1 and 1ª. Since the rollers 13 are only in use for the purpose of temporarily removing the suction-box structure from the machine, they are made arranged to be removable when the suction-box structure has been returned to its operative position in the machine. For this purpose these rollers are journaled on the headed pins 15 which pass through the hubs of the rollers and are fitted into the eyed brackets 16, integral with or forming part of the frame 4, and are secured at their ends by cotter pins 17 or the like.

Figure 6:
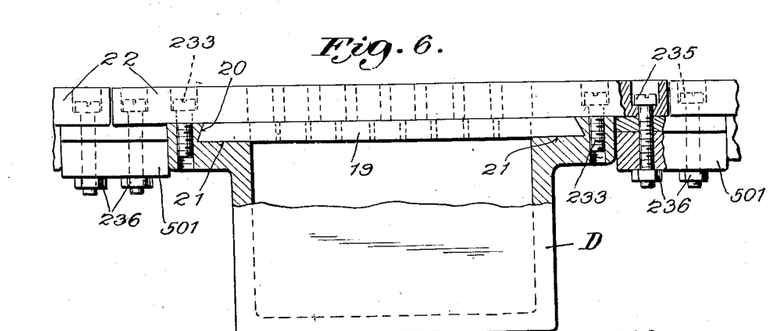
Figs. 6, 7, 8, 9 and 10 are enlarged detail views, showing the construction and arrangement of the suction-boxes and their covers, Figs. 6, 7 and 10 being in elevation, and Figs. 8 and 9 top-plan views.
Figure 7:
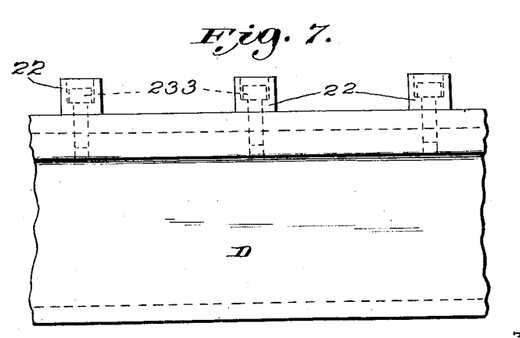
Figure 8:
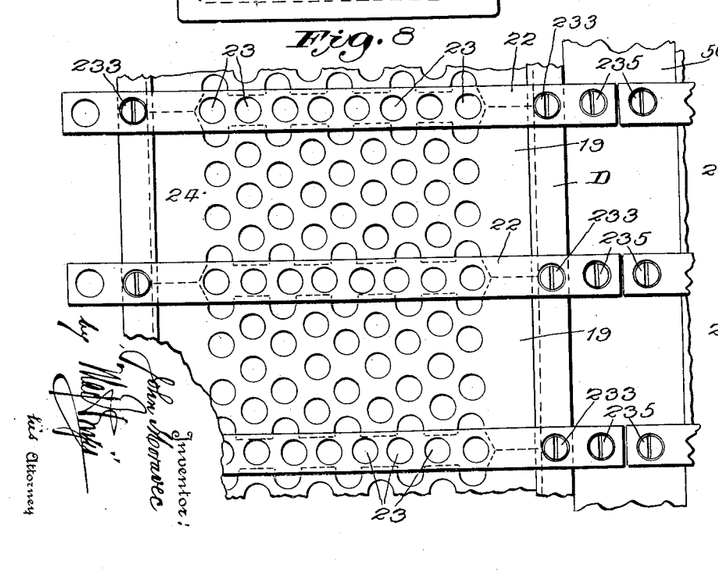
Figure 9:
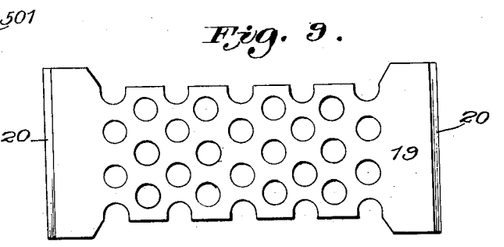
Figure 10:
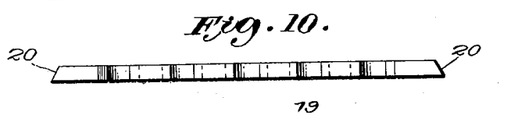

In order to provide guides for the traveling chains of which the wire-screen support consists under the preferred embodiment of my invention and coincidently to preserve the extent of the perforated area of the suction-box cover for the withdrawal of the water from the paper stock, I prefer to construct and arrange the perforate suction-box covers 18 as appears in Figs. 6 to 10. By referring to these figures it will be seen that these covers are formed of a series of perforated metallic plates or sections 19 beveled or mitred at their sides 20, 20. The top of the suction-box D is provided with correspondingly formed or undercut seats 21 so as to receive and engage the beveled or mitred sides of the plates 19 and to hold them against upward removal in the manner of a dovetail joint, as seen in Fig. 6. The cover of each suction-box D is formed of a series of these sections engaging the seats 21 and each abutting against the succeeding and the preceding one. Each joint between the sections 19 is covered by a metal rib or bar 22, also provided with perforations 23 communicating with the interior of the suction-box through the space or opening between adjacent cover sections 19 appearing in dotted lines in Fig. 8. As shown in Figs. 6, 7 and 8, these ribs or bars 22 are secured to the top of the suction-box D by countersunk screw-bolts 233, so as not to break the continuity of the upper surface of said ribs.

As seen in Figs. 2, 5, 6 and 8, these perforated sections and the perforate ribs 22 extend over the entire top of each suction-box and combine to form a complete perforate suction-box table F, which table covers the entire suction-box group or unit. The ribs 22 of each suction-box are in line with the corresponding ribs of the other suction-boxes, as best seen in Figs. 2 and 5, and they are arranged parallel with each other. Thereby they form parallel grooves 24 in the unitary suction-box cover formed of the individual plates 19 and ribs 22 extending over and across the entire top or table of the suction-box structure, as appears best in Figs. 2 and 5. These grooves serve to receive and to guide the traveling wire-supporting chains 1 passing from the guide rolls 3 over the suction-box table and through the grooves 24 of the same to the drive-rolls 2, as best seen in Figs. 1 and 2.

In order to resist the wear occasioned by the passage of the carrier-chains through the grooves 24 and also to reduce the friction to a minimum, I make the plates 19 and the bars 22 of hard fritcion-reducing metal, such as 10% aluminum-bronze or of duralumin or duraluminium.

In order to facilitate a smooth running of chains 1 and to prevent any sagging of the same between the edges of adjacent suction-boxes D, particularly if the gaps between the suction-boxes should be wider than the length of the chain-links 50, ledges 501, consisting in the construction shown of two flat strips or bars of hard wood or metal extending the entire length of the suction-boxes, are closely fitted between the suction-boxes D so as to be flush with the suction-box tops, and are secured in position by screw-bolts 235 whose heads are countersunk in the bars 22 and which are secured at their lower ends below the ledges 501 by lock-nuts 236, as best seen in Figs. 6 and 8.

As best seen by the reference to Figs. 1, 1ª, and 5, the end-frames 4 are provided at each end with rectangular grooved openings or recesses 25 into which are accurately fitted the slidable bored pillow blocks or journal bearings 26 in which the journals or gudgeons 27 of the rolls 2 and 3 are received and supported, these gudgeons being firmly held against rotation in the pillow blocks by suitable means, such as keys or wedges or the set-screws 28. The blocks 26 are horizontally adjustable in position by the adjusting screws 29 threaded in the frame as shown and bearing against or engaging the blocks 26, as will be readily understood.

The construction and arrangement of the rolls 2 and 3 mounted in the pillow-blocks 26 are shown in detail in Figs. 15 to 26.

Figure 15:
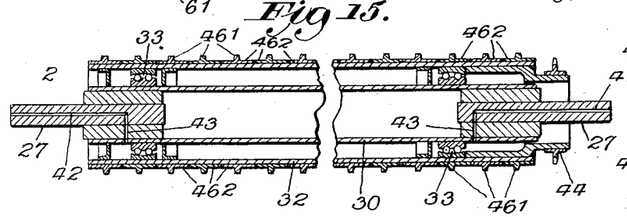
Figs. 15 and 16 represent an elevation and end-view, respectively, of one form of drive-rolls for the chains forming the wire-cloth carrier.
Figure 16:
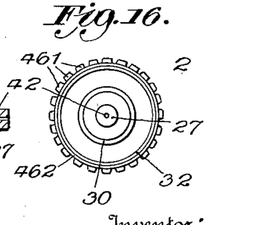

In Figs. 15 and 16 I have represented one form of a drive-roll 2 which comprises a hollow metal tube 32 mounted on and encircling a central hollow metal shaft 30 formed with gudgeons or journals 27 extending from and firmly secured to the shaft at its ends, said journals being designed to engage the pillow-blocks 26 as above described. In order to permit the tube 32 to readily rotate on the shaft 30, ball bearings 33 are interposed between the two at each end. The outer surface of the tube 32 is equipped with sprockets 461 for engaging the chain 1 of the traveling wire support A (Figs. 1, 2 and 3), which sprockets are formed on the sleeves 462, which are mounted on and encircle the tube 32 in a contiguous series and are shrunk thereon to be firmly seated against lateral and rotary slip. In order to furnish lubricant to the ball-bearings 33, oil ducts 42, 43 are formed in the gudgeons and lead through the shaft 30. A sprocket-wheel or pulley 44 keyed or otherwise secured to one end of the roll-tube 32 serves to receive the power to drive the same from a chain or belt. The guide-rolls 3 are constructed in the same way as the rolls 2, with the exception that for the former the sprockets 461 and the drive pulley 44 are absent.

Figures 17, 18, 21:
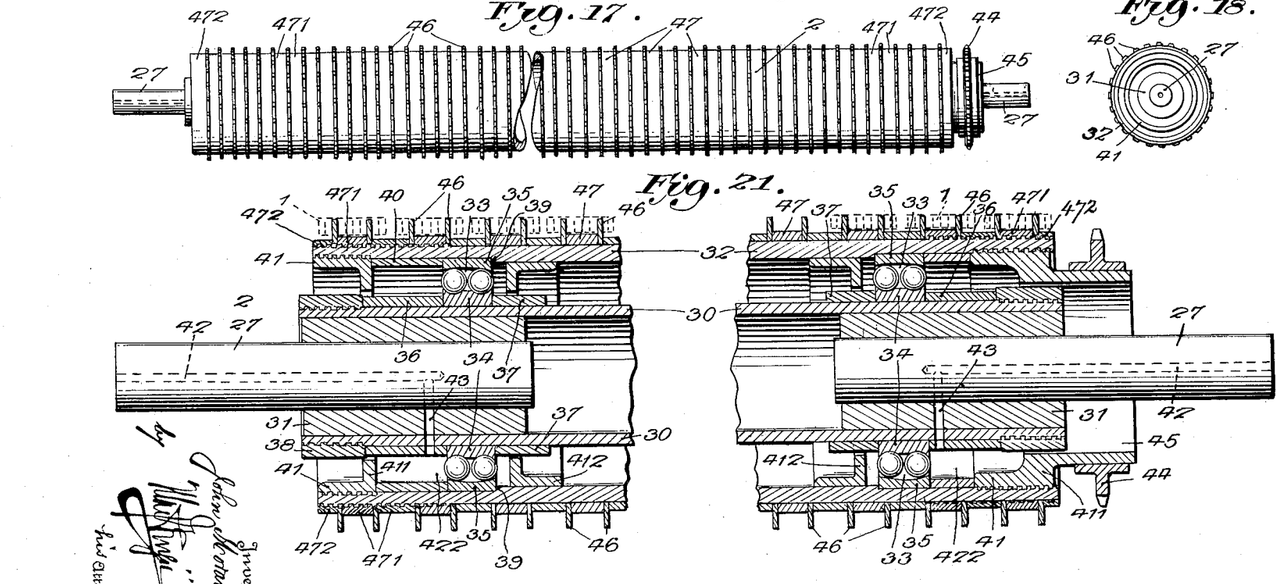
Figs. 17 and 18 are similar views of another and preferred form of drive-roll.
Fig. 21 is a longitudinal central section of the driving roll, on an enlarged scale, taken on line 21—21, Fig. 23.
Figure 19:
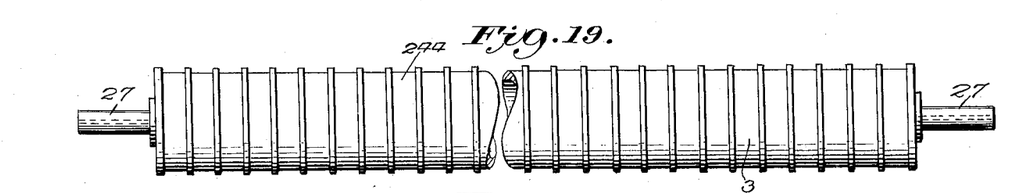
Figs. 19 and 20 are similar views of the idler or carrying roll for the chains.
Figure 20:
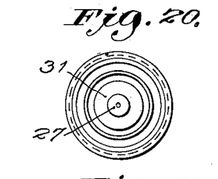
Figures 22, 23, 24, 25, 26:
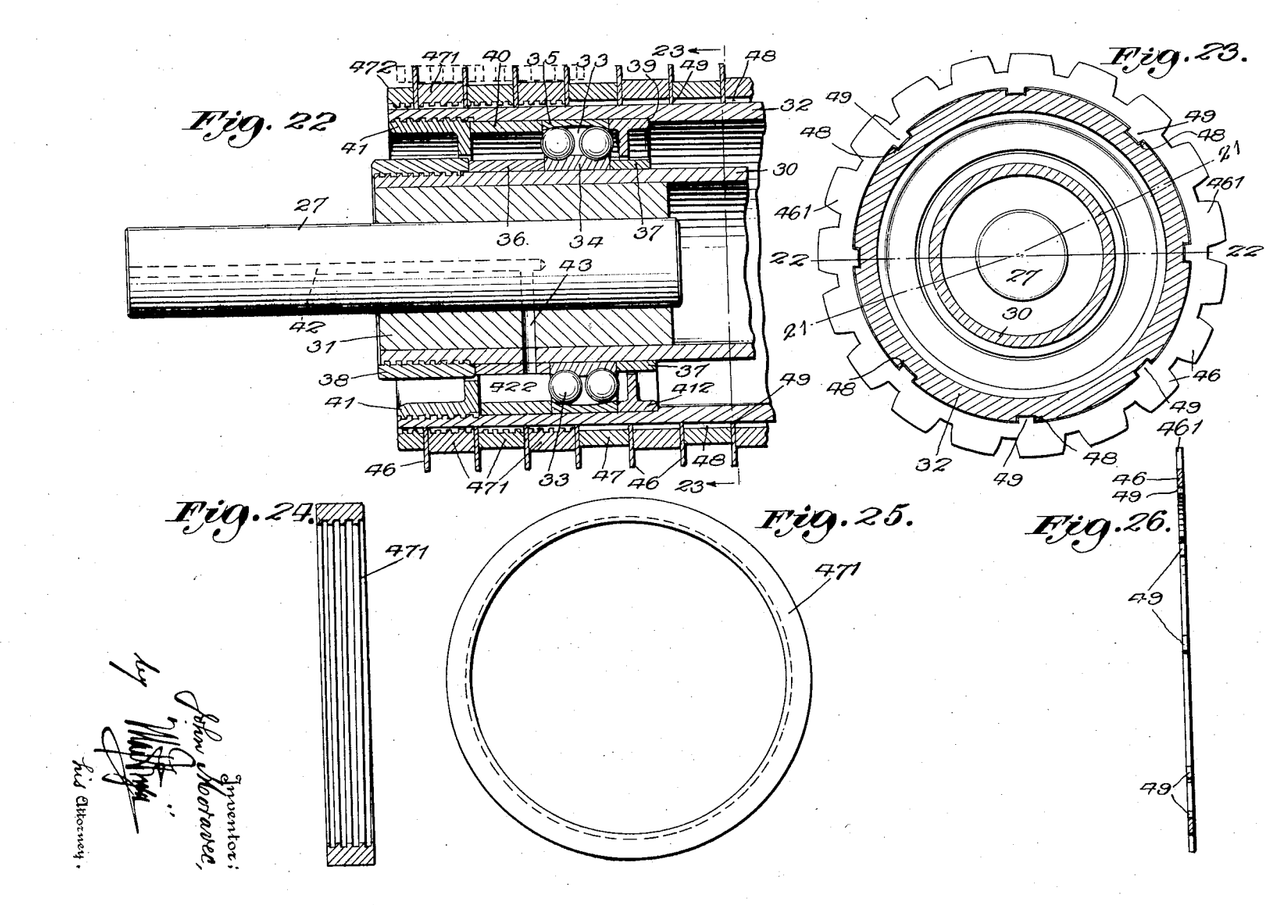
Fig. 22 is a longitudinal central section, on a still more enlarged scale, of one end of the drive-roll, said section being taken on line 22—22, Fig. 23.
Fig. 23 is a transverse vertical section thereof on line 23—23, Fig. 22.
Figs. 24 and 25 are a longitudinal central section and an end-view, respectively, of the threaded sleeves on the drive-roll.
Fig. 26 is a central vertical section of one of the sprocket disks of the drive-roll.

In Figs. 17 to 26 I have represented a modified form of drive and guide-rolls which I find preferable for most purposes. By turning to these figures it will be noted that each of the rolls 2 and 3 is formed of a central hollow metal shaft 30 made of a steel pipe and provided at each end with a metal bushing 31 fitted and pressed tightly onto or otherwise immovably and rigidly connected with the gudgeon 27, the bushing 31 being in turn firmly secured to the hollow shaft 30 by shrinking the same thereon or in other suitable ways. The shaft 30 serves to support the hollow metal tube 32 which encircles the same, is of the same length as the same and forms the outer rotary member of each of the rolls. In order to facilitate the easy rotation of the tube 32 on fixed shaft 30, there are arranged between the tube and the shaft anti-frictional bearings, such as the ball-bearings 33, near each end of the rolls, as shown in Figs. 21 and 22, said ball-bearings being constructed and arranged in any suitable and convenient manner, and preferably as shown; that is to say, the balls or rollers being seated between annular sleeves 34 and 35 secured to the outer and inner walls of the hollow shaft 30, and the tube 32, respectively. As shown, each of the annular seating sleeves 34 is secured in position between two stops or shoulders in the form of annular sleeves 36 and 37, secured to the shaft 30, the outer sleeve being additionally held by a threaded collar 38 engaging the threaded end of shaft 30. The seating sleeves 35 are similarly held in position between a shoulder or abutment 39 on the inner surface of the tube 32 and an annular sleeve 40, against which abuts a threaded bushing 41 engaging the interiorly threaded end of said tube. In order to feed the lubricating oil to the ball-bearings 33, the gudgeons 27 are provided with central lubricating ducts or channels 42 communicating with radial ducts 43 leading into the interior of the chamber 422 inclosing the ball-bearings as shown. The lubricating oil is retained in this space by the annular flanges 411 on the bushings 41 and the annularly flanged sleeves 412 secured to the interior walls of tube 32 and forming said chamber 422. One bushing or neck piece 41 (in the present case the one at the right-hand end of the roll) is provided at the portion which extends outside the tube 32 with a sprocket wheel 44 to which the power to rotate the drive-roll 2 is applied. Said sprocket-wheel 44 may be secured to said outwardly extending portion or collar 45 in any suitable way, such as by shrinking or keying the same thereon; or it may be made integral therewith.

For propelling the traveling apron comprising the endless chains 1 over the suction-box cover and through the grooves of the same, the drive-rollers 2 are provided at proper intervals with sprockets arranged to engage the said endless chains. These sprockets may be of any suitable or desired form, but I prefer to form them on the rolls 2 as disclosed in Figs. 2, 3 and 17, and in detail in Figs. 21 to 26, wherein it will be seen that on the tube 32 forming part of the roll 2 are mounted a series of toothed or sprocket rims 46 formed with sprockets 461 and encircling the tube, and which are spaced apart at uniform distances by interposed sleeves 47. In order to tightly clamp this series of sprocket-rims alternating with the sleeves in position, a number of the outermost sleeves 471 at each end of the roll are provided with interior screw threads arranged to engage exterior threads at the two ends of said roll, an interiorly threaded cap-sleeve 472 at each end serving to close the series and to retain the first and the last sprocket in place. By first slipping the unthreaded sleeves 47 with the interposed sprocket-rims 46 onto the tube 32 and thereupon driving home the threaded sleeves 471 and 472 in succession and, this being done from both ends of the roll coincidently, the said sprocket-rims will be clamped and held in position on the roll. For greater security, the cap-sleeve 472 and the outermost of the threaded sleeves 471 at each end of tube 32, after the same have been driven home, may be shrunk onto said tube. The cap-sleeves 472, when properly brought into position on the tube, also serve as lock-nuts to resist any rotation of the inner threaded sleeves. To positively hold the sprocket-rims 46 against rotation or slip with relation to the tube 32, the said tube is furnished, at proper intervals, with longitudinal grooves 48, which grooves are engaged by splines or languets 49 formed on the interior of the sprocket-rims 46, as seen in Figs. 22, 23 and 26. The sprocket-rims 48 are preferably made of nickel-steel plate by pressing.

The wire-carrying chains 1 which engage and travel over the rolls 2 and 3 are shown in their preferred form in detail in Figs. 11 to 14 of the drawing. In the form represented in Figs. 11 and 12 the chain consists of a series of transverse rows of links 50 formed of comparatively thin strips or blanks of strong sheet-metal each perforated at both ends. These links are connected by pivot pins 51 passing through the perforations of the overlapping ends of the links in such a manner that the perforated ends of one row of links alternate with the perforated ends of the next row of links, each longitudinal series of links being separated from the next series by washers or collars 52, preferably of case-hardened steel, encircling the pivot-pins and arranged between each longitudinal series of links and the series to each side of it.

Figure 11:
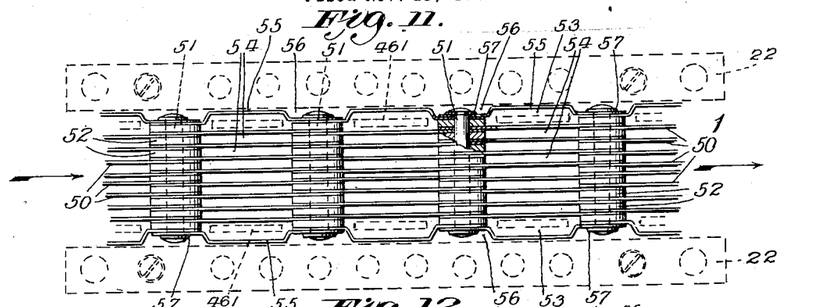
Figs. 11 and 12 represent a detail-plan and a side-elevation, respectively, of an endless chain forming part of the wire-cloth carrier.

By this arrangement the wire-carrier chain is made openwork with spaces or perforations over its area to permit the drainage of the water from the paper stock on the wire, and to receive the sprockets 461 of the drive-roll 2. In Fig. 11 I have indicated in dotted lines in the outer chain-openings 53 the positions of the said sprockets 461 when the chain is mounted on the rolls 2 and 3, in the case that each chain is engaged by two sprocket-rims 46, as indicated in Fig. 2. Where the chain is engaged by a larger number of sprocket-rims, the intermediate openings 54 will afford the space for receiving the teeth of the additional sprocket-rims.

In order to insure a smooth and unobstructed travel of the chains from the guide-rolls into the grooves 24 of the suction-box cover 18, the outer links at each side of the chain are bent outwardly, as at 55, so as to form recesses 56 whereby the heads 57 of the pivot-pins 51 are guarded against collision with any part in their passage from the carrying rolls 2 into the grooves 24. This construction of chain, while offering the advantages above set forth, can be made comparatively light in weight consistent with strength, and at a minimum cost.

Figures 12, 13:
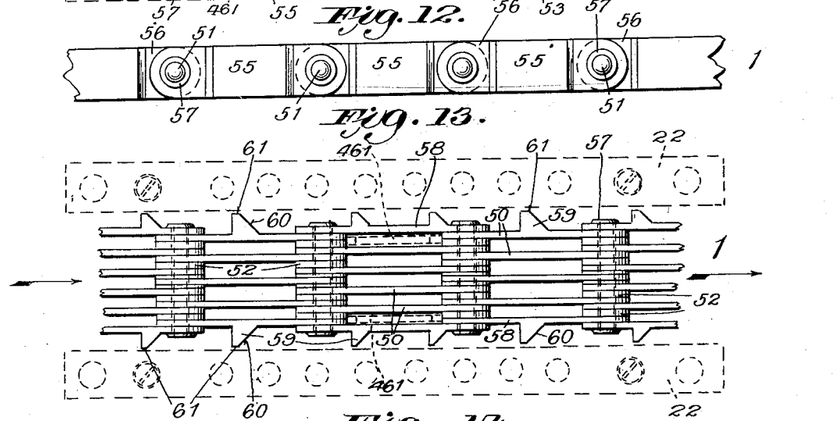
Figs. 13 and 14 represent similar views of a somewhat modified form of the chain.
Figure 14:
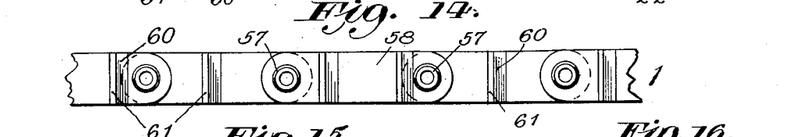

In Figs. 13 and 14 a somewhat modified form of chain construction under my invention is disclosed. This embodiment differs from the one above described principally in that the outer links 58, instead of being bent outwardly, are straight, and provided with outwardly extending bosses 59, which are beveled at their forward surfaces 60 and whose outer faces 61 are all in line or in a vertical plane parallel to the links 50. Thereby also recesses for the heads 57 of the pivot-pins are formed and the even travel of the chain through the groove 24 between the bars 22 is assured.

Where the chains 1 each engage two sprocket disks 46, as indicated in Figs. 11 and 13, two such sprockets corresponding to and being opposite to each groove 24 of the suction-box table F and to each groove 244 of the guide-roll 3, the sleeves 47 of the drive-roll 2 are made of two different thicknesses, so that sleeves of one thickness alternate with sleeves of less thickness, as appears in Figs. 21 and 22. Thereby the chains 1, resting with their intermediate portions on the thicker sleeves, have their portions, extending over the adjoining thinner sleeves, maintained out of contact with the latter, as indicated in dotted lines in said Figs. 21 and 22. The friction of the chains traveling over the roll 3 is thereby reduced.

The mode of operation and functioning of the described combination and arrangement of parts will be understood from the above. When the suction-box units G are in place and secured to the rails 10 of the machine frame 11 by the bolts 12 and power is applied to the sprocket or pulley 44 of the drive-roll 2, for example by a power chain or belt 444 indicated in dotted lines in Fig. 1, the wire-carrying apron, consisting in the present instance of the wire-carrying chains 1, which supports the wire A with the wet paper-stock or pulp thereon is caused to travel over the suction-box table F in the direction of the arrow, Figs. 1 and 2. The speed of the drive-roll 2 is so adjusted that the carrier chains 1 travel at the same speed as the wire A. The water from the stock on the wire is drained through the openwork chains and through the perforations of the table F, and, where the preferred form of grooved table is employed, the chains are accurately guided and at the same time the friction between the parts is reduced to a very low figure by constructing the parts of metal and by the flow of drained water from the pulp between the chains and the table. The wire being supported by the chain is carried through the machine without coming into contact with the suction-box table, all destructive friction and other resistances being thus eliminated, whereby the said wire is preserved against wear and destruction for a very much greater period than where the wire is in direct contact with the suction-box table as in the art as heretofore practiced.

When, however, the occasion arises to replace the old wire by a new one, an entire suction-box unit comprising three or more suction-boxes may be removed at one operation by withdrawing the bolts 12 which connect the flanges 5 to the rails 10 therefrom, securing the rollers 13 in place and introducing the rails or planks 14 under the rollers so as to rest on the horizontal crossbars 144 of the machine frame, whereupon the entire unit comprising a plurality of suction-boxes may be removed from the machine with little effort by grasping the handles 145, Fig. 2, as will be understood. When then a new wire has been introduced into the paper-making machine the suction-box unit or units are reinstalled into position by reversing the above operations; that is to say, rolling the unit or units back into position under the new wire A over the rails 14, and then securing the same to the frame by passing the cap-screws 12 through the rails 10 and the flanges 5 of the end-frames 4, and then, if desired, removing the rollers 13 and the rails 14.

By thus securing a group of suction-boxes to the frames to form a suction-box unit the necessity of laboriously removing each individual suction-box separately is done away with and considerable labor is saved each time a wire-screen has to be renewed. The arrangement whereby a series of suction-boxes are secured to end-frames, which in turn are removably secured to the railing of the machine, has the advantage of enabling the existing paper-making machines of the modern type which are provided with the railing above the suction-box space to be equipped with the improved suction-box and the wire-supporting arrangement without further changing or remodeling, which involves a considerable economy in installation. Moreover, this new arrangement of the suction-box units permits the old suction-boxes of the old structures and which consist in expensive bronze castings to be utilized in the new arrangement, it being only necessary to equip them with new perforated covers 18 and guides 22 for the traveling chains or carriers.

In order to remove an individual suction-box D from a suction-box group structure G for the purpose of repairing or replacing a perforated plate 19 or other part of the suction-box, or its top, the bolts 9 securing the suction-box to the flange or shelf 5 and also the bolts 235 connecting the same to the ledges 501 are removed, whereupon the suction-box can be withdrawn from the structure. By removing the bars 22 after withdrawing the bolts 233, any perforated plate 19 may be removed for repair or substitution by longitudinally moving it and the preceding plates 19 from engagement with the undercut seats 21.

The rollers 2 and 3 may also be removed from each suction-box unit for repair or adjustment, after severing the chains at one pivot-pin connection, by withdrawing or sliding the pillow-blocks 26 outwardly from the recesses 25.

The details and particularities of construction and arrangement of parts hereinbefore described, while constituting an effective embodiment of my invention, may be widely modified while keeping within the spirit of and without departing from my said invention, whose scope has been defined and pointed out in the claims.

While I have described and shown the details of construction of the drive and guide-rolls 2 and 3 for the purpose of a full disclosure, I do not herein claim the invention embodied in them, having claimed the same in my concurrent divisional application Serial No. 119,157, filed June 28, 1926.

What I claim as my invention and desire to secure by Letters Patent is:

1. In a paper-making machine, a suction-box table and a drive-roll, in combination with a carrier for supporting a wire-screen apron, mounted on the drive-roll and arranged to be driven over said table, said carrier comprising a series of unconnected chains.

2. In a paper-making machine, a suction-box table, in combination with a carrier for supporting a wire-screen apron arranged to travel over the table, said carrier comprising a series of chains, the links of each chain being connected by separate pivot pins.

3. In a paper-making machine, a perforate suction-box table and a wire-screen apron arranged to travel over the same, in combination with a series of separate chains arranged between the suction-box table and the wire-screen apron and supporting said apron, and means for propelling the chains over the suction-box table.

4. In a paper-making machine, a perforate suction-box table and a wire-screen apron arranged to travel over the same, in combination with a drive-roll and a series of separate chains for supporting the wire-screen apron engaging said drive-roll and arranged to travel between the said apron and the suction-box table.

5. In a paper-making machine, a suction-box table and a wire-screen apron arranged to travel over the suction-box table, in combination with rolls and a series of separate chains for supporting the apron, the chains being arranged to travel between the suction-box table and the apron, said chains being mounted on the rolls and arranged to be driven by the same.

6. In a paper-making machine, a driving roll and a carrying roll, a perforate suction-box table arranged between the rolls, and a wire-screen apron arranged over the suction-box table, in combination with a series of separate endless chains supporting the apron and arranged to travel over the suction-box table, said chains being mounted on the rolls.

7. In a paper-making machine, a driven sprocket-roll and a carrying roll, a suction-box table arranged between the rolls, and a wire-screen apron arranged over the suction-box table, in combination with a series of separate endless chains supporting the apron and arranged to travel over the suction-box table, said chains engaging the sprockets of the sprocket-roll and mounted on the carrying roll.

8. In a paper-making machine, a suction-box table provided with grooves or channels and a wire-screen apron arranged over the table and to travel over the same, in combination with a series of traveling chains arranged to support the apron, said chains being arranged in the said grooves.

9. In a paper-making machine, a suction-box table provided with grooves or channels, and a wire-screen apron arranged over the same, in combination with traveling chains for supporting the apron and arranged in the grooves or channels, said chains extending slightly above the tops of the grooves.

10. In a paper-making machine, a perforate suction-box table provided with upper grooves or channels, and a wire-screen apron arranged over the same, in combination with a sprocket drive-roll and a grooved carrying roll, and chains arranged to travel over the suction-box table to engage the grooves of the cover, the grooves of the carrying roll, and the sprockets of the drive roll.

11. In a paper-making machine, a number of suction-boxes having perforate covers provided with upper grooves or channels, and a wire-screen apron arranged to travel over the covers, in combination with chains for supporting the apron arranged between the apron and the suction-box covers and engaging the grooves thereof, and means to propel the chains over the suction-boxes.

12. In a paper-making machine, a number of suction-boxes having perforate covers provided with upper grooves or channels, and a wire-screen apron arranged to travel over the covers, in combination with chains between the covers and the apron engaging the grooves and extending above the tops of the same, and arranged to support the apron, and means to propel the chains over the suction-boxes.

13. In a paper-making machine, a removable suction-box structure comprising end-frames, and transverse stays connecting the said end-frames, in combination with a plurality of suction-boxes connected at each of their ends to the said end-frames.

14. In a paper-making machine, a removable suction-box structure comprising end-frames, and transverse stays connecting the said end-frames, in combination with a plurality of suction-boxes, each connected at its ends to the said end-frame above the transverse stays.

15. In a paper-making machine, a suction-box structure comprising end-frames each formed with a horizontal flange or shelf, in combination with transverse stays arranged between the frames and connected thereto, and a number of suction-boxes extending between the frames and each connected at each end to the flanges or shelves.

16. In a paper-making machine, a suction-box structure comprising end-frames each formed with an upper horizontal flange or shelf, in combination with transverse stays extending between the end-frames and connected at their ends to the lower portion of the said frames, and a number of suction-boxes extending between the frames and connected at each end to the upper horizontal flanges or shelves.

17. A suction-box structure comprising a pair of end-frames each formed at each end with a recess for the reception of a journal-bearing, transverse stays arranged between and secured to the end-frames, in combination with a number of suction-boxes also arranged between and secured to the end-frames.

18. In a paper-making machine, a suction-box structure comprising a pair of end-frames each provided with a journal bearing at each end, and a number of suction-boxes arranged between and secured to the end-frames, in combination with rolls journaled in the journal bearings, and a traveling carrier arranged to pass over the rolls and over the suction-boxes.

19. A perforate suction-box cover provided at intervals with ribs projecting above the same to form grooves for traveling carriers.

20. A perforate suction-box cover provided at intervals with ribs projecting above the same and having perforations communicating with openings in the suction-box cover, whereby grooves for traveling carriers are formed on the cover.

21. A suction-box cover comprising a plurality of contiguous perforate plates, in combination with ribs projecting above the plates and arranged over the joints between the plates.

22. A suction-box cover comprising a plurality of perforate plates arranged to adjoin each other but to leave an opening between the plates, in combination with perforate ribs secured over the plates at their joints so that the perforations in the ribs communicate with the opening between the plates.

23. A suction-box provided with undercut seats, in combination with a contiguous series of perforate cover-sections or plates engaging said seats, and ribs arranged over the joints of said cover-sections and secured to the suction-box.

24. A suction-box structure comprising a plurality of suction-boxes, said suction-boxes being each provided with perforate covers, in combination with ribs or bars arranged at intervals on and projecting above the covers to form a series of transverse grooves or channels across the suction-boxes.

25. A suction-box structure comprising a plurality of parallel suction-boxes, said suction boxes being each provided with a series of adjacent perforate cover-sections, in combination with bars secured over the joints between the cover-sections and arranged to form a series of parallel ribs extending across the suction-boxes, to form a series of transverse grooves over the suction-boxes.

26. A group of parallel suction-boxes each having perforate covers and bars or ribs arranged at intervals on the covers so as to form parallel grooves over the suction-box covers, in combination with ledges arranged in the spaces between the suction-boxes, to form a continuous surface across the suction-box group.

27. A group of parallel suction-boxes each having perforate covers and bars or ribs arranged at intervals on the covers so as to form parallel grooves over the suction-box covers, in combination with ledges arranged in the spaces between the suction-boxes, to form a continuous surface across the suction-box group, said ledges being secured to the ends of the bars or ribs.

28. A wire-supporting chain comprising a series of transverse rows of links, the ends of one row of links overlapping the ends of the adjoining rows and being secured together by transverse pivot-pins, the outer links of each row being formed to provide a recess for the heads of the pivot-pins.

29. A wire-supporting chain comprising a series of transverse rows of flat links overlapping at their ends and connected by pivot-pins passing through the perforations in said ends, the links of the transverse rows being spaced apart and the outer links of each row being bent outwardly to form recesses between the links for the reception of the heads of the pivot-pins.

30. A suction-box table formed of perforate plates of metal and metal guide-bars arranged to form grooves for traveling chains.

31. In a paper-making machine, a suction-box table, a drive roll, and a pulp or paper-carrying apron mounted on said drive roll and arranged to be driven over said table, in combination with a carrier for supporting said pulp or paper-carrying apron, said carrier comprising a series of unconnected chains.

32. In a paper-making machine, a suction-box table and an apron arranged to travel over the same, in combination with a series of separate chains arranged between the suction-box table and the apron and supporting said apron, and means for propelling the chains over the suction-box table.

In testimony whereof I hereunto affix my signature.

JOHN MORAVEC.